United States Patent
Klassen et al.

(10) Patent No.: US 6,212,536 B1
(45) Date of Patent: Apr. 3, 2001

(54) METHOD FOR GENERATING WEB BROWSER SENSITIVE PAGES

(75) Inventors: Christopher Laith Klassen, San Jose; Howard Rose, Foster City, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/004,207

(22) Filed: Jan. 8, 1998

(51) Int. Cl.[7] .................................... G06F 15/00
(52) U.S. Cl. .................. 707/513; 707/500; 707/501; 707/514
(58) Field of Search .................. 707/513, 514, 707/500, 501

(56) References Cited

U.S. PATENT DOCUMENTS

| | | | |
|---|---|---|---|
| 5,495,567 | * | 2/1996 | Iizawa et al. ............ 707/102 |
| 5,649,186 | * | 7/1997 | Ferguson ................. 707/10 |
| 5,845,075 | * | 12/1998 | Uhler et al. ............. 707/10 |
| 5,940,834 | * | 8/1999 | Pinard et al. ............ 707/102 |
| 5,953,731 | * | 9/1999 | Glaser .................... 707/513 |
| 5,958,008 | * | 8/1999 | Pogrebisky et al. ....... 709/223 |
| 5,987,480 | * | 11/1999 | Donohue et al. .......... 707/501 |

OTHER PUBLICATIONS

Juan T. Llibre, http://www.aspalliance.com/juan/browscap.asp, pp. 1–3, 1997.*
Ken Spencer, Doi Client/Serv The Microsoft Way (Technology Information), pp. 1–3, Nov. 19, 1997.*

* cited by examiner

Primary Examiner—Stephen S. Hong
Assistant Examiner—Cong-Lac Huynh
(74) Attorney, Agent, or Firm—Kudirka & Jobse, LLP

(57) ABSTRACT

Disclosed is a system for generating code into a template, such as a HyperText Markup Language (HTML) template. A server receives a request for information from a browser program, such as an HTML browser, over a network such as the Internet. The browser program provides browser identification information to the server with the information request. In response to the information request, the server processes a template, wherein the template includes a conditional command having two parameters. A first parameter indicates the browser identification information and a second parameter represents a browser feature. The server processes the conditional command to determine whether the browser program represented by the first parameter supports the browser feature represented by the second parameter. Upon determining that the browser program represented by the first parameter supports the browser feature represented by the second parameter, the server generates the lines of code into the template.

23 Claims, 4 Drawing Sheets

METHOD FOR GENERATING WEB BROWSER SENSITIVE PAGES

BACKGROUND OF THE INVENTION

1. Field of the Invention

The present invention relates to a method for generating pages for web browsers and, in particular, web browser pages which are sensitive to the features supported by the web browser to which the page is directed.

2. Description of the Related Art

Internet web browsers, such as the Microsoft Internet Explorer™ and the Netscape Navigator™, provide different browsing capabilities. Moreover, web browsers are implemented in different versions, each version including different browser features and capabilities. Oftentimes, users maintain and use older versions of a browser and do not upgrade to more recent versions which support additional features. Given the variety of commercial web browsers being used and the features they support, web page designers have difficulty coding a web page that will be acceptable to all the different browsers.

For instance, recent versions of HyperText Markup Language (HTML) web browsers allow framing. With HTML frames, a web page can be divided into multiple, scrollable regions. Each frame can be provided an individual Uniform Resource Locator (URL) to load information independent of the other frames. A target name can be used to allow the frame to be targeted by other URLs. HTML frames allow users to change the contents in one frame without effecting what is presented in other independent frames. Certain HTML browsers, such as Microsoft's Internet Explorer Version 2.0 do not support framing. Such web browsers that do not support framing will ignore HTML frame commands and display the contents of the information in the page in a single web page without displaying the information in frames.

Web designers have difficulty designing a template that can generate web pages in a format that is compatible with the various web browser types and version numbers that are being used.

SUMMARY OF THE INVENTION

To overcome the limitations in the prior art described above, preferred embodiments of the present invention disclose a system for generating lines of code into a template. A server receives a request for information from a browser program over a network. The browser program provides browser identification information to the server with the information request. In response to the information request, the server processes a template, wherein the template includes a conditional command having two parameters. A first parameter indicates the browser identification information and a second parameter represents a browser feature. The server processes the conditional command to determine whether the browser program represented by the first parameter supports the browser feature represented by the second parameter. Upon determining that the browser program represented by the first parameter supports the browser feature represented by the second parameter, the server generates the lines of code into the template.

In further embodiments, the step of determining whether the browser program represented by the first parameter supports the browser features represented by the second parameter further comprises the steps of checking a file stored in a memory area of the server that includes an entry for the browser feature represented by the second parameter and a plurality of values associated with entry. Each associated value represents a browser program that supports the browser feature at the entry. The server determines whether the first parameter matches one of the values associated with the browser feature entry represented by the second parameter. Upon determining that the first parameter matches one of the values associated with the browser feature entry, the server indicates that the browser program represented by the first parameter supports the browser feature represented by the second parameter.

It is an object of the present invention to allow web designers to write web templates, such as HTML templates, such that the CGI application processing the template will generate a web page, e.g., HTML page, that includes code dependent upon the type and version number of the web browser requesting the web page.

It is yet a further object that lines of code in a web template be nested within conditional statements that determine whether the browser requesting the web page supports a feature represented by a parameter in the conditional statement. If the requesting browser supports the feature represented by the parameter in the conditional statement, then the code associated with the conditional statement is generated into the template to form a web page that is then transferred to the requesting web browser.

It is still a further object that if the requesting browser does not support the feature represented by the parameter in the conditional statement, then the code associated with the conditional statement is removed from the web page to be transferred to the requesting web browser.

In this way, web pages are generated to only include code that is supported by the type of browser requesting the web page.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

Figure 1:
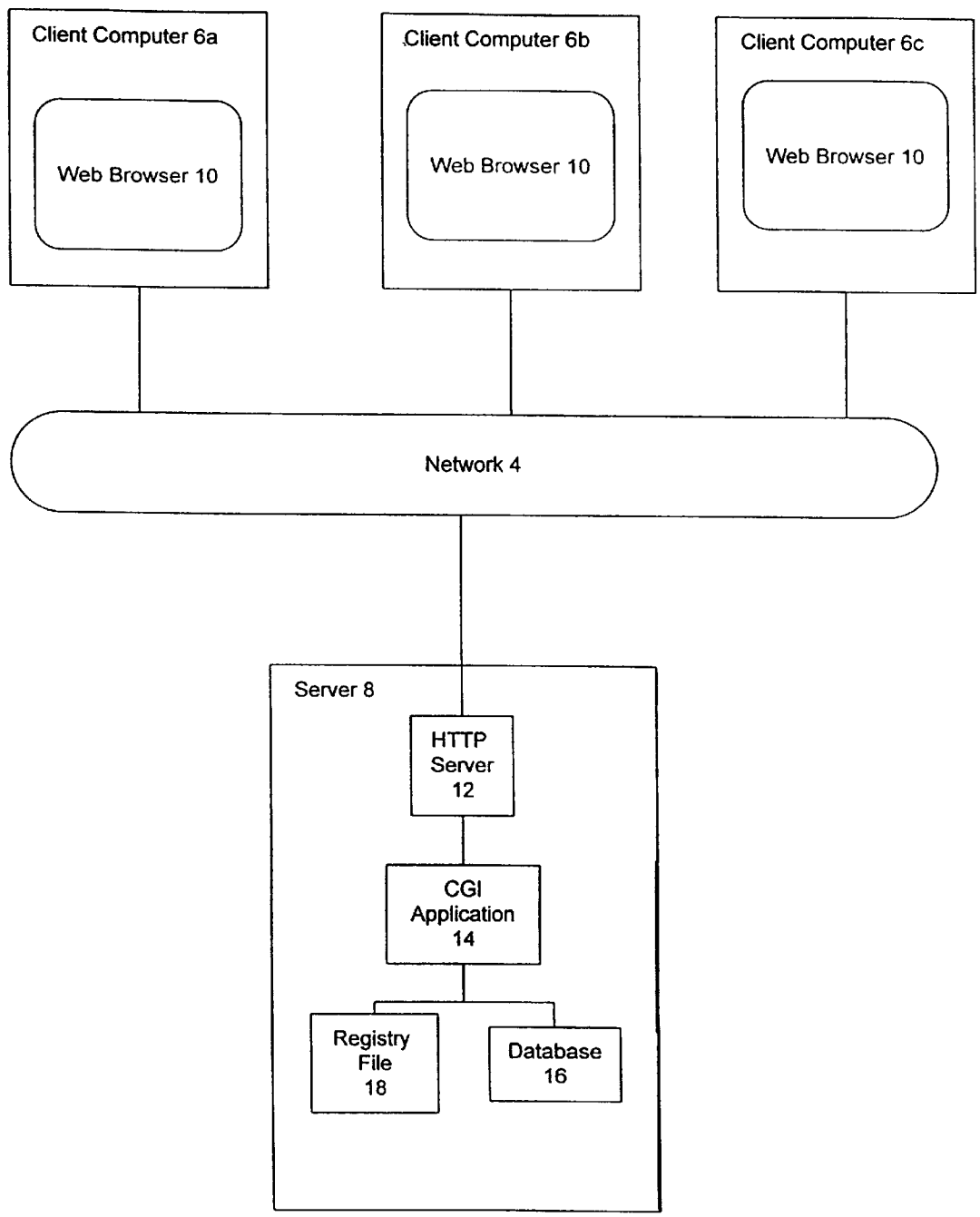
FIG. 1 is a block diagram that illustrates a preferred hardware and software environment in accordance with preferred embodiments of the present invention.

FIG. 1 schematically illustrates the computer hardware and software environment of the preferred embodiment of the present invention, and more particularly, illustrates a typical distributed computer system 2 using the Internet or other network 4 to connect a plurality of client computers 6a, b, c to a server 8. A typical combination of resources may include clients computers 6a, b, c that are personal computers, laptops, palmtops, personal digital assistants (PDAs) or workstations, and a server 8 that is a personal computer, workstation, minicomputer or mainframe. The server 8 may be implemented in one or more computers. The network 4 may comprise networks such as LANs, WANs, SNA networks, and the Internet.

In preferred embodiments, the client computers 6a, b, c include a Hyper Text Markup Language (HTML) web browser 10 (e.g., IBM's Web Explorer™, Netscape's Navigator™, Sun Microsystems's HotJava Browser™, Microsoft's Internet Explorer™, etc.). The server 8 includes a Hyper Text Transport Protocol (HTTP) server program 12 and a Common Gateway Interface (CGI) application program 14. The CGI application 14 processes requests for information received fromthe client computers 6a, b, c via the HTTP server 12. The CGI application 14 may obtain requested information from an associated database 16. The CGI application 14 would retrieve an HTML template and include the requested information obtained from the database 16 in the retrieved HTML template to generate a web page. The CGI application 14 would then pass the generated HTML web page including the retrieved database information to the HTTP server 12 to pass back to the web browser 10 of the requesting client computer 6a, b, c. The database 16 may be a post office system of electronic messages. In such case, the CGI application 14 provides access to the post office system, including all post offices in the system that users may access.

Figure 2:
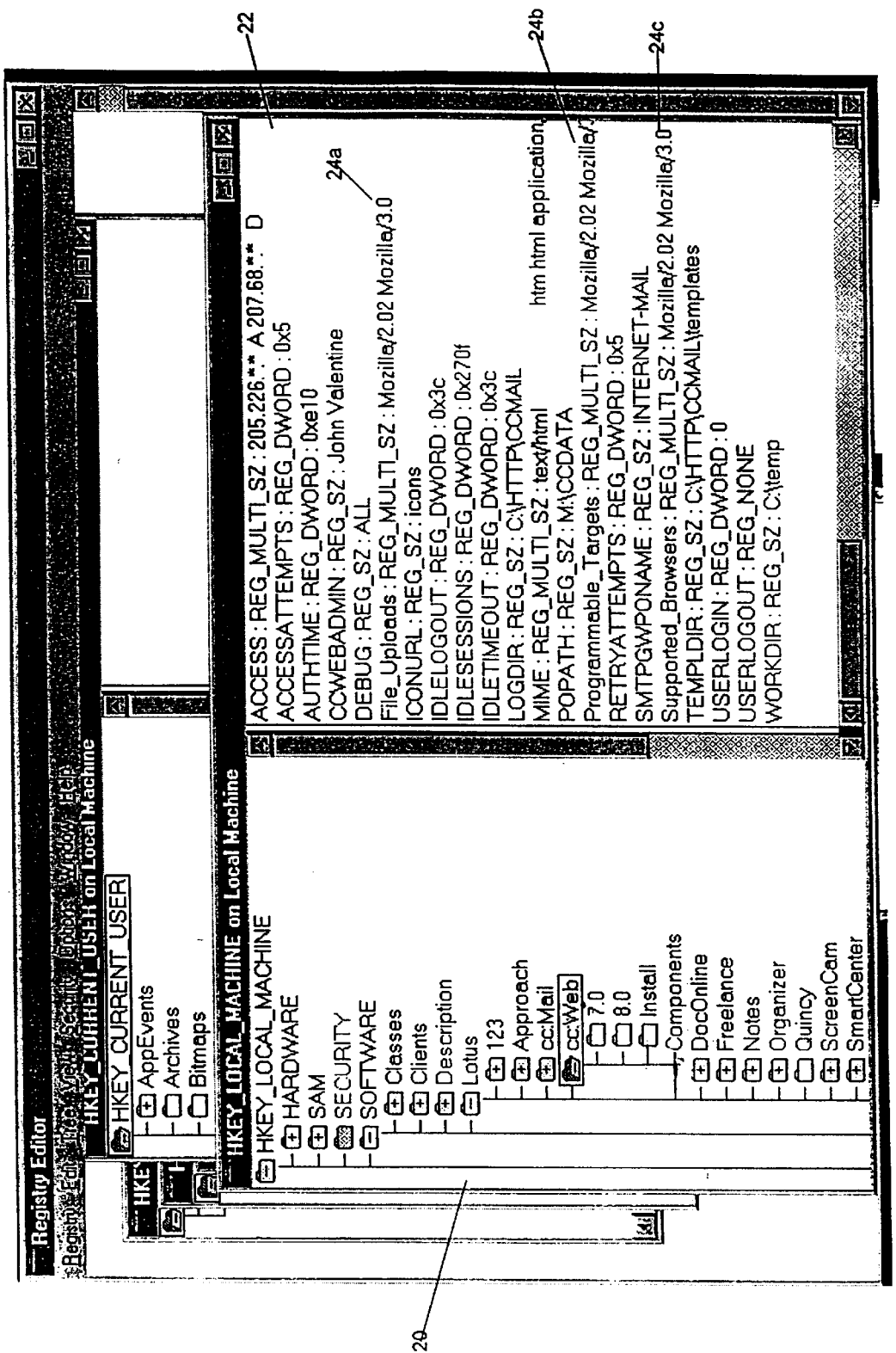
FIG. 2 illustrates a portion of a registry file used with preferred embodiments of the present invention.

A registry file 18 is maintained in the server 8 and includes information on the hardware and software settings for the server 8. The registry file 18 may organize information in a hierarchical fashion, such as the Microsoft Windows 95™ registry file. The registry file 18 includes entries referred to as keys and subkeys, which are arranged hierarchically. Each key and subkey is associated with a plurality of value entries that are the actual configuration data. FIG. 2 illustrates information from the Microsoft Windows 95 registry file displayed by the Registry Editor program. Window 20 shows a labeled HKEY_LOCAL_MACHINE key which includes information on individual program settings that apply to every user of the server 8 and the hardware configuration of the server 8. The HKEY_LOCAL_MACHINE key 20 includes different subkeys for each application program installed in the server 8.

Window 20 has a frame 22 which shows subkeys providing information on the Lotus Development Corporation cc:Web™ program. In certain embodiments, the cc:Web program is installed on the server 8 to perform post office system and CGI application 14 operations. The frame 22 lists subkeys 24a, b, c that represent browser features and capabilities. For each of these subkeys 24a, b, c there are one ore more values indicating the browser and versions numbers that support the browser feature represented by the subkey, e.g., Mozilla version 2.02, Mozilla version 3.0. Mozilla is a name for the Netscape Navigator browser. For instance, the subkey "File_Uploads" 24a has values indicating those web browsers types that provide File_Upload capabilities. A browser that supports "File_Upload" capabilities allows the user to use the browser to upload files to the server 8. The subkey "Programmable_Targets" 24b has values indicating those web browsers which support HTML framing capabilities. The subkey "Supported_Browsers" 24c has values indicating those web browsers that are compatible with the cc:Web program. The systems administrator may edit the registry file 18 to add subkeys indicating new browser capabilities and add or edit values for a subkey indicating new browser types and versions which support the browser feature represented by the subkey. In alternative embodiments, subkeys in addition to those described above may be used to represent other browser capabilities. Moreover, the subkey and values shown in FIG. 2 may describe web browsers compatible with any type of CGI application program 14, not just the cc:Web application program described with respect to FIG. 2.

The present invention may be implemented as a method, apparatus, or article of manufacture using standard programming and/or engineering techniques to produce software, firmware, hardware, or any combination thereof. The term "article of manufacture" as used herein is intended to encompass any device, carrier, or media that provides access to instructions and/or data useful in performing the same or similar functionality.

Those skilled in the art will recognize that the exemplary environment illustrated in FIG. 1 is not intended to limit the present invention. Indeed, those skilled in the art will recognize that other alternative hardware and software environments may be used without departing from the scope of the present invention. Furthermore, the HTTP server 12, CGI application 14, and database 16 or any combination thereof may be installed on a single computer server or over several servers distributed over a network.

Generating a Web Page Dependent On the Type of Requesting Browser

Figure 3:
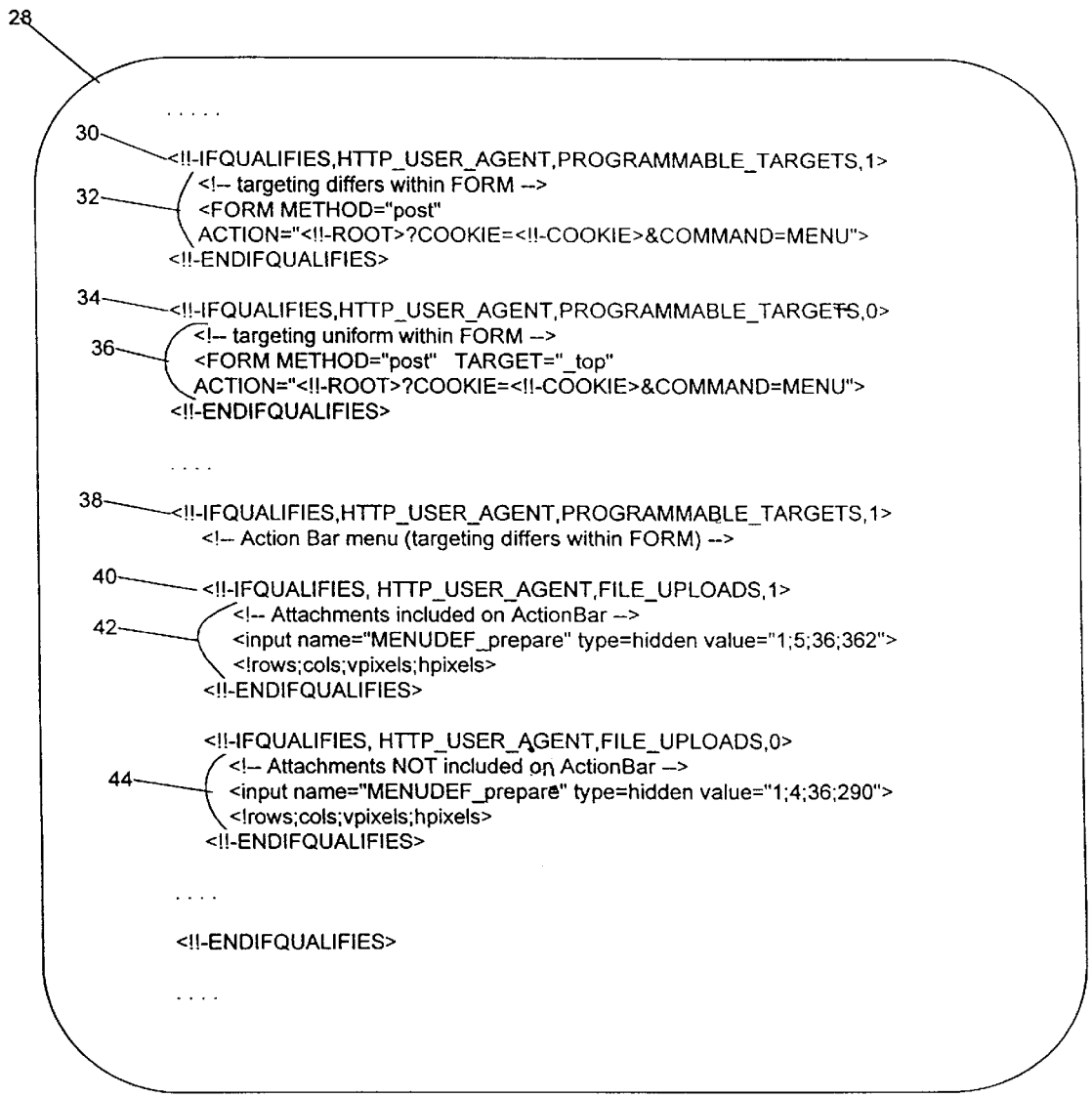
FIG. 3 illustrates a preferred embodiment of portions of an HTML template that includes conditional statements in accordance with preferred embodiments of the present invention.

FIG. 3 illustrates portions of an HTML template 28 used to generate an HTML web page. This template 28 is maintained in a non-volatile storage area of the server 8. This template 28 includes the IFQUALIFIES command, which has three parameters. The first parameter is browser identification (ID) information. The web browser 10 provides browser ID information when the web browser 10 transmits a request for information to the server 8. The CGI application 14 sets the browser ID parameter to the browser identification information provided by the web browser 10. The second parameter is the subkey in the registry file 18 representing a browser feature to be checked. The third parameter is a boolean one or zero. For each IFQUALIFIES command there is a corresponding ENDIFQUALIFIES tag.

The CGI application 14 generates the HTML template 28 including the IFQUALIFIES command from a non-volatile memory area in the server 8. The CGI application 14 then processes the IFQUALIFIES commands in the template 28 to determine whether the subkey in the registry file 18, identified by the second parameter, includes the browser ID, represented by the first parameter, as a value. If the registry file lists the first parameter as a value associated with the subkey parameter, then IFQUALIFIES is true; otherwise IFQUALIFIES is false. If the third boolean parameter is one (true) and the browser ID represented by the first parameter matches a value associated with the subkey represented by the second parameter in the registry file 18, then the HTML code between the IFQUALIFIES command and the corresponding ENDIFQUALIFIES tag is generated into the template. Otherwise, the HTML code is not generated into the template. If the third boolean value is zero and IFQUALIFIES is false, i.e., the first parameter browser ID is not listed in the registry file 18 as a value for the subkey identified by the second parameter, then the HTML code between the IFQUALIFIES command and the ENDIFQUALIFIES command is generated into the template. Otherwise, the HTML code is not generated into the template. In preferred embodiments, the IFQUALIFIES command and ENDIFQUALIFIES tag are replaced with the code therebetween. A web page is created by the CGI application 14 processing the template 28 and generating data and HTML code therein.

The template 28 in FIG. 3 exemplifies how the IFQUALIFIES command may be used. HTTP_USER_AGENT is the browser ID set by the CGI application 14 based upon the browser identification information provided by the web browser 10. PROGRAMMABLE_TARGETS is a subkey whose values indicate those web browser types and version numbers that support HTML framing. The values for the PROGRAMMABLE_TARGETS subkey may also indicate whether the browser supports selecting the target frame within the header material that surrounds the web page returned by the CGI application 14. As shown in the embodiment of FIG. 3, the IFQUALIFIES command is utilized in sets for each of the different possible conditions. The first IFQUALIFIES command 30 generates a block of HTML code 32 if the browser ID (HTTP_USER_AGENT) is listed in the registry file 18 as a value associated with the PROGRAMMABLE_TARGETS subkey. If not, the block of HTML code 32 is not generated into the template as the browser 10 does not support framing. The CGI application 14 then processes the next IFQUALIFIES command 34. In this command 34, if the browser ID (HTTP_USER_AGENT) is not a value associated with the PROGRAMMABLE_TARGETS subkey as listed in the registry file 18, i.e., the browser does not support framing, then the block of code 36 is generated into the HTML template 28. The IFQUALIFIES command 38 includes a nested IFQUALIFIES command 40 which is used to determine whether the browser supports FILE_UPLOADS, i.e., allows the client computer 6a, b, c to upload files to the server 8. If so, the block of code 42 is generated into the HTML template, otherwise the block of code 44 not is generated into the template.

In the above exemplars, the IFQUALIFIES command determined whether a browser supports two features, framing and file uploading. Those skilled in the art will appreciate that the IFQUALIFIES command can be used to determine whether other browser features are supported by the browser identified by the first parameter. The system administrator may edit the registry file 18 to add values to the subkeys indicating new browsers and versions supporting particular features or add new subkeys indicating new browser features and capabilities. In this way, web developers can write a single HTML template 28 that generates code based on the type and version number of the web browser 10 requesting information from the server 8.

The IFQUALIFIES command may be written in any computer language which can be processed by the CGI application 14, such as C++, Java™, Perl, etc. Java is a trademark of Sun Microsystems, Inc. In alternative embodiments, a name other than IFQUALIFIES may be used for the command which determines whether a particular web browser feature is supported by the browser 10. Moreover, different parameters than those set forth above may be used with the IFQUALIFIES command to determine whether the browser 10 requesting information supports specific browser features and capabilities.

Logic for Generating Browser Sensitive Web Pages

Figure 4:
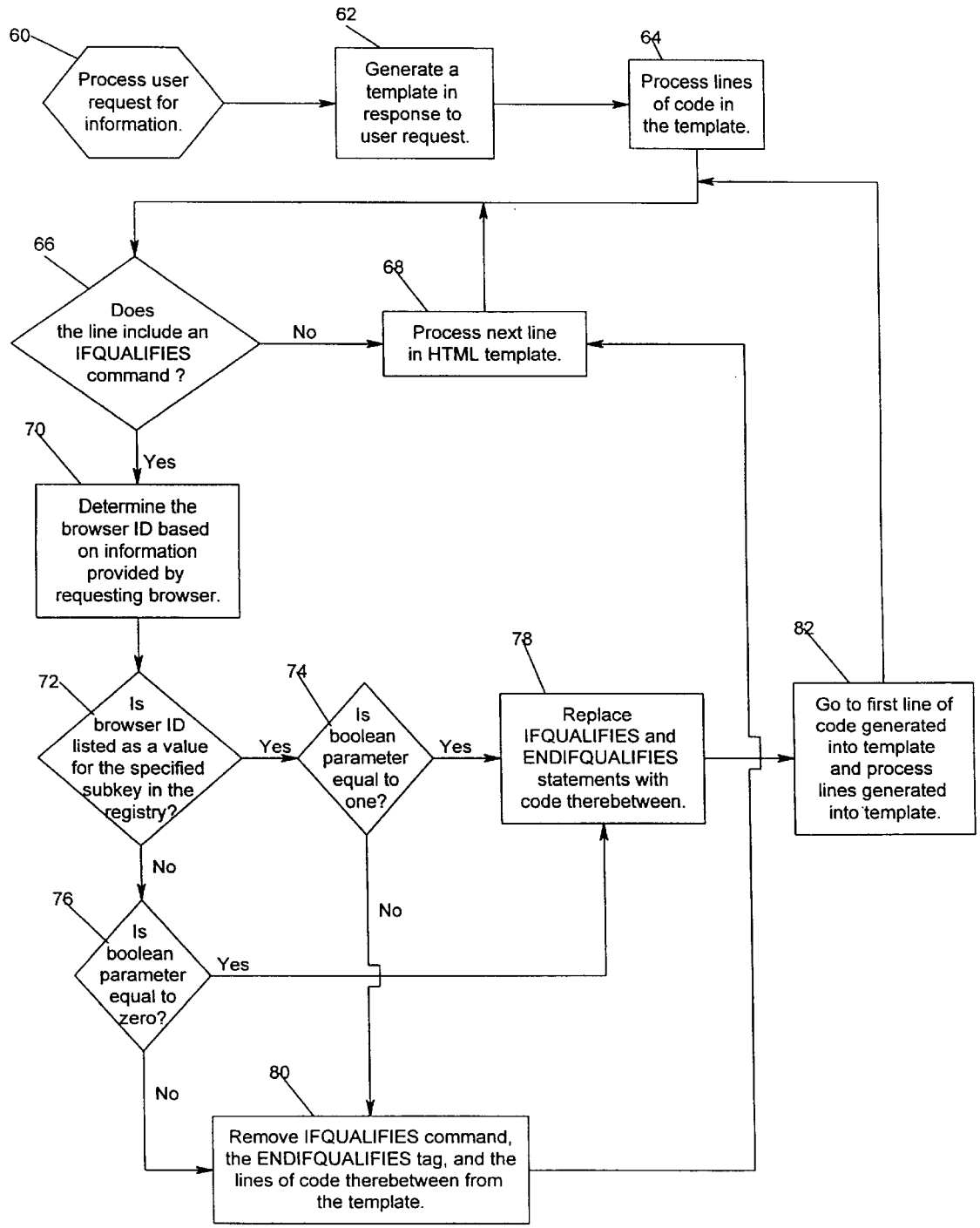
FIG. 4 illustrates logic implemented in the server to generate code in templates to create web pages dependent on the type of browser requesting information from the server.

FIG. 4 illustrates preferred logic for the processing of a request from the web browser 10 in the client computer 6a, b, c and generating a web page based on the type and version number of the browser 10. This logic may be implemented as software in the CGI application 14 or in a computer program in the server 8 which processes user requests for information.

Control begins at block 60 which represents the CGI application 14 receiving a request from a user at a client computer 6a, b, c for information via the HTTP server 12. This request may include a request for information maintained in the database 16. Control transfers to block 62 which represents the CGI application 14 generating an HTML template 28 (FIG. 3) in response to the user request. Template 28 including HTML code may be stored in a non-volatile memory location in the server 8. Control then proceeds to block 64 which represents the CGI application 14 proceeding to the first line of code in the template 28 to process the lines of code therein. The template 28 includes HTML code understood by the web browser 8 and commands interpreted by the CGI application 14. These commands interpreted by the CGI application 14 program would include database commands that the CGI application 14 processes to obtain user requested information from the database 16 and the IFQUALIFIES command and ENDIFQUALIFIES tag discussed above. The CGI application 14 processes all the commands and codes in the template 28 to generate a web page that is transferred to the web browser 10. Commands for a CGI application 14 implemented in an electronic mail program are described in Lotus Development Corporation's 1997 publication entitled "Customizing Lotus cc:Mail Release 8 for the World Wide Web," which is incorporated herein by reference in its entirety.

Control then proceeds to block 66 which is a decision block representing the CGI application 14 determining whether the line of code includes an IFQUALIFIES command. As discussed, the IFQUALIFIES command has three parameters, a browser ID parameter indicating the type of browser 10 installed in the requesting client computer 6a, b, c, a subkey in the registry file 18 indicating a browser feature, and a boolean parameter indicating a true or false condition. If, at block 66, the CGI application 14 determines that the command is not an IFQUALIFIES command, then control proceeds to block 68 which represents the CGI application 14 processing the next line of code in the HTML template. Otherwise, control proceeds to block 70 to process the IFQUALIFIES command.

Block 70 represents the CGI application 14 setting the browser ID parameter in the IFQUALIFIES command to the browser ID information provided by the browser 10. Control then proceeds to block 72 which is a decision block representing the CGI application 14 checking the registry file 18 to determine whether the browser ID parameter is listed as a value in the subkey identified by the second parameter in the IFQUALIFIES command. As discussed, the subkey represents a particular browser feature and the browser ID values listed for a subkey in the registry file 18 represent those browser types and version numbers that support the browser feature represented by the subkey. If the first parameter browser ID matches a value in the subkey identified by the second parameter in the registry file 18, then control proceeds to block 74; otherwise control proceeds to block 76. Block 74 is a decision block representing the CGI application 14 determining whether the boolean parameter, the third parameter in the IFQUALIFIES command, is one, i.e., true. If so, control proceeds to block 78; otherwise control proceeds to block 80.

If the browser ID is associated with the subkey in the registry file 18 and the boolean value is one (true), then control proceeds to block 78 which represents the CGI application 14 replacing the IFQUALIFIES command and the ENDIFQUALIFIES tag with the block of code therebetween. If additional IFQUALIFIES commands are nested within the processed IFQUALIFIES command, then those nested IFQUALIFIES commands would be generated into the template. Control then proceeds to block 82 which represents the CGI application 14 proceeding to the first line of the code generated into the template to process each line of code and the lines of code following the replaced ENDIFQUALIFIES tag. From block 82 control transfers back to block 66 to continue processing the lines of commands in the template 28.

If the boolean parameter is zero, i.e., false, and the first parameter browser ID matches a value associated with the subkey represented by the second parameter in the registry file 18, then control transfers to block 80 which represents the CGI application 14 skipping the lines of code between the IFQUALIFIES and corresponding ENDIFQUALIFIES tag and not generating such code into the template. This skipped code and processed IFQUALIFIES command and ENDIFQUALIFIES tag are removed from the template. If IFQUALIFIES commands are nested within the processed IFQUALIFIES commands, then those nested IFQUALIFIES commands would also be removed from the template. From block 80, control transfers back to block 68 to process the lines of code in the template following the removed ENDIFQUALIFIES tag.

If at block 72, the CGI application 14 determines that the first parameter browser ID is not listed as a value in the subkey in the registry file 18, i.e., the browser 10 in the requesting client computer 6a, b, c does not support the feature represented by the subkey parameter, then control transfers to block 76 which represents the CGI application 14 determining whether the boolean parameter is zero, i.e., false. If so, control transfers to block 78; otherwise control transfers to block 80. If the first parameter browser ID does not match a value of the second parameter subkey in the registry file 18 and the boolean parameter is zero, i.e., false, then the intervening block of code between the IFQUALIFIES and ENDIFQUALIFIES statements is intended for browsers 10 that do not support the browser feature represented by the second parameter subkey. In such case, control proceeds to block 78 to replace the IFQUALIFIES and ENDIFQUALIFIES statements with the block of intervening code therebetween. If the browser ID is not listed as a value in the registry file 18 and the boolean value is one, i.e., true, then this indicates that the browser 10 does support the feature represented by the key parameter and that the intervening code is intended for browsers 10 that do not support the feature. In such case, control transfers to block 80 to skip the block of intervening code and remove the IFQUALIFIES command, ENDIFQUALIFIES tag, and intervening code from the template 28.

Conclusion

This concludes the description of the preferred embodiments of the invention. The following describes some alternative embodiments for accomplishing the present invention.

In alternative embodiments, different commands may be used to perform the functions of the IFQUALIFIES and ENDIFQUALIFIES statements. Still further, parameters other than those discussed above may be utilized with such statements.

In addition, those skilled in the art will appreciate that the present invention is not limited to HTML templates, but may be employed in any template which is processed by programs implemented in different versions. In this way, the commands generated into the template are sensitive to the version of the program which processes the template. This invention is particularly suitable for limited capability web browsers. For instance, a PDA, with limited memory, may include a web browser with minimal features. With the IFQUALIFIES embodiment of the present invention, the web designer may create a template that could generate code tailored to the limited web browsers installed on a PDA. Alternatively, this same template could generate more advanced HTML code if the requesting browser is an advanced version installed on a powerful hardware platform.

In the preferred embodiments the registry file 18 is organized hierarchically by keys and subkeys, which have associated values. However, in alternative embodiments the registry file may describe hardware and software system configuration information in a format different from the hierarchical format discussed above.

Further, in the preferred embodiments, the client computers 6a, b, c communicate with the server 8 using the HTTP protocol. However, other client/server communication protocols which provide for the exchange of client identification information to the server can be utilized. Such client/server communication protocols can be modified to provide a mechanism to check on the capabilities of the client based on identification information provided by the client and generate data dependent on the client identification information.

Still further, it should be appreciated that the preferred logic of FIG. 4 is provided for illustrative purposes and that alternative logic may be used to generate browser sensitive templates.

In summary, preferred embodiments of the present invention disclose a system for generating code into a template. A server receives a request for information from a browser program over a network. The browser program provides browser identification information to the server with the information request. In response to the information request, the server processes a template, wherein the template includes a conditional command having two parameters. A first parameter indicates the browser identification information and a second parameter represents a browser feature. The server processes the conditional command to determine whether the browser program represented by the first parameter supports the browser feature represented by the second parameter. Upon determining that the browser program represented by the first parameter supports the browser feature represented by the second parameter, the server generates the lines of code into the template.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for generating code into a template, comprising:

receiving with a server a request for information from a browser program over a network, the browser program providing browser identification information to the server;

in response to the request for information, processing with the server a template, the template including a conditional command having two parameters, a first parameter indicating the browser identification information and a second parameter representing a browser feature, the conditional command followed by one or more lines of code and an end tag;

processing the conditional command with the server to determine whether the browser program represented by the first parameter supports the browser feature represented by the second parameter; and generating lines of code into the template upon determining that the browser program represented by the first parameter supports the browser feature represented by the second parameter, including replacing the conditional command and the end tag with the lines of code upon determining that the browser program represented by the first parameter supports the browser feature represented by the second parameter.

2. The method of claim 1, wherein determining whether the browser program represented by the first parameter supports the browser feature represented by the second parameter further comprises:

checking a file stored in a memory area of the server that includes an entry for the browser feature represented by the second parameter and a plurality of values associated with the entry, each associated value representing a browser program that supports the browser feature at the entry;

determining whether the first parameter matches one of the values associated with the browser feature entry represented by the second parameter; and indicating that the browser program represented by the first parameter supports the browser feature represented by the second parameter upon determining that the first parameter matches one of the values in the file associated with the browser feature entry represented by the second parameter.

3. The method of claim 2, wherein the file is a registry program including hardware and software configuration information for the server.

4. The method of claim 1, further comprising:

removing the conditional command, the end tag, and the lines of code therebetween from the template upon determining that the browser program represented by the first parameter does not support the browser feature represented by the second parameter.

5. The method of claim 1, wherein the template is a HyperText Markup Language (HTML) template, the browser program is an HTML browser, and wherein the server includes a Hypertext Transfer Protocol (HTTP) program to receive requests from the browser program over the network.

6. A method for generating code into a template, comprising:

receiving with a server a request for information from a browser program over a network, the browser program providing browser identification information to the server;

in response to the request for information, processing with the server a template, the template including a conditional command having three parameters, a first parameter indicating the browser identification information, a second parameter representing a browser feature, a third parameter indicating one of a first state and a second state;

processing the conditional command with the server to determine whether the browser program represented by the first parameter supports the browser feature represented by the second parameter; and generating the lines of code into the template upon making one of the following determinations:

that the browser program represented by the first parameter supports the browser feature represented by the second parameter and that the third parameter indicates the first state; and that the browser program represented by the first parameter does not support the browser feature represented by the second parameter and that the third parameter indicates the second state.

7. The method claim 1 wherein the browser identification information indicates a type and version of the browser program.

8. A computer programming apparatus for generating code into a template comprising:

means, performed by a server, for receiving a request for information from a browser program over a network, the browser program providing browser identification information to the server;

means, performed by the server, in response to the request for information, for processing a template, the template including a conditional command having two parameters, a first parameter indicating the browser identification information and a second parameter representing a browser feature, the conditional command is followed by one or more lines of code and an end tag;

means, performed by the server, for processing the conditional command to determine whether the browser program represented by the first parameter supports the browser feature represented by the second parameter; and means for generating lines of code into the template upon determining that the browser program represented by the first parameter supports the browser feature represented by the second parameter, the means for generating lines of code comprising means for replacing the conditional command and the end tag with the lines of code upon determining that the browser program represented by the first parameter supports the browser feature represented by the second parameter.

9. The computer programming apparatus of claim 8, wherein the server includes a memory and the means for determining whether the browser program represented by the first parameter supports the browser feature represented by the second parameter further comprises:

means for checking a file stored in the memory of the server, the file including an entry for the browser feature represented by the second parameter and a plurality of values associated with the entry, each associated value representing a browser program that supports the browser feature at the entry;

means for determining whether the first parameter matches one of the values associated with the browser feature entry represented by the second parameter; and means for indicating that the browser program represented by the first parameter supports the browser feature represented by the second parameter upon determining that the first parameter matches one of the values in the file associated with the browser feature entry represented by the second parameter.

10. The computer programming apparatus of claim 9, further comprising:

means for removing the conditional command, the end tag, and the lines of code therebetween from the template upon determining that the browser program represented by the first parameter does not support the browser feature represented by the second parameter.

11. A computer programming apparatus for generating code into a template comprising:

means, performed by a server, for receiving a request for information from a browser program over a network, the browser program providing browser identification information to the server;

means, performed by the server, in response to the request for information, for processing a template, the template including a conditional command having three parameters, a first parameter indicating the browser identification information, a second parameter representing a browser feature, and a third parameter indicating one of a first state and a second state;

means, performed by the server, for processing the conditional command to determine whether the browser program represented by the first parameter supports the browser feature represented by the second parameter; and means for generating the lines of code into the template upon making one of the following determinations:

that the browser program represented by the first parameter supports the browser feature represented by the second parameter and that the third parameter indicates the first state; and that the browser program represented by the first parameter does not support the browser feature represented by the second parameter and that the third parameter indicates the second state.

12. A server apparatus for generating code into a template, comprising:

a computer program, the computer program receives a request for information from a browser program over a network, the browser program providing browser identification information to the server;

a memory storing a template, the template including:

(i) a conditional command having two parameters, a first parameter indicating the browser identification information and a second parameter representing a browser feature, the conditional command followed by one or more lines of code and an end tag in the template, wherein the computer program processes the conditional command to determine whether the browser program represented by the first parameter supports the browser feature represented by the second parameter; and (ii) lines of code, wherein the computer program generates the lines of code into the template upon determining that the browser program represented by the first parameter supports the browser feature represented by the second parameter and wherein the computer program replaces the conditional command and the end tag with the lines of code upon determining that the browser program represented by the first parameter supports the browser feature represented by the second parameter.

13. The server apparatus of claim 12 further including:

a file stored in the memory, including:

(i) an entry for the browser feature represented by the second parameter;

(ii) a plurality of values associated with the entry, wherein each associated value represents a browser program that supports the browser feature at the entry, wherein the computer program determines whether the first parameter matches one of the values associated with the browser feature entry represented by the second parameter, wherein the computer program indicates that the browser program represented by the first parameter supports the browser feature represented by the second parameter upon determining that the first parameter matches one of the values associated with the browser feature entry represented by the second parameter.

14. The server apparatus of clam 13, wherein the file is a registry program including hardware and software configuration information for the server.

15. The server apparatus of claim 14 wherein the computer program removes the conditional command, the end tag, and the lines of code therebetween from the template upon determining that the browser program represented by the first parameter does not support the browser feature represented by the second parameter.

16. A server apparatus for generating code into a template, comprising:

a computer program, the computer program receiving a request for information from a browser program over a network, the browser program providing browser identification information to the server;

a memory storing a template, the template including:

(i) a conditional command having two parameters, a first parameter indicating the browser identification information and a second parameter representing a browser feature, the conditional command followed by one or more lines of code and an end tag in the template, wherein the computer program processes the conditional command to determine whether the browser program represented by the first parameter supports the browser feature represented by the second parameter; and (ii) lines of code, wherein the computer program generates the lines of code into the template upon determining that the browser program represented by the first parameter supports the browser feature represented by the second parameter wherein the computer program generates the lines of code into the template upon making one of the following determinations:

that the browser program represented by the first parameter supports the browser feature represented by the second parameter and that the third parameter indicates the first state; and that the browser program represented by the first parameter does not support the browser feature represented by the second parameter and that the third parameter indicates the second state.

17. An article of manufacture for use with a computer system, the article of manufacture comprising a computer-readable storage medium having program code embodied therein comprising:

program code for receiving a request for information from a browser program over a network, the browser program providing browser identification information to the system;

program code for, in response to the request for information, processing a template, the template including a conditional command having two parameters, a first parameter indicating the browser identification information and a second parameter representing a browser feature, the conditional command followed by one or more lines of code and an end tag;

program code for processing the conditional command to determine whether the browser program represented by the first parameter supports the browser feature represented by the second parameter; and program code for generating lines of code into the template upon determining that the browser program represented by the first parameter supports the browser feature represented by the second parameter, the program code for generating lines of code into the template comprising program code for replacing the conditional command and the end tag with the lines of code upon determining that the browser program represented by the first parameter supports the browser feature represented by the second parameter.

18. The article of manufacture of claim 17, wherein the program code for determining whether the browser program represented by the first parameter supports the browser feature represented by the second parameter further comprises:

program code for checking a file stored in a memory area of the server that includes an entry for the browser feature represented by the second parameter and a plurality of values associated with the entry, wherein each associated value represents a browser program that supports the browser feature at the entry;

program code for determining whether the first parameter matches one of the values associated with the browser feature entry represented by the second parameter; and program code for indicating that the browser program represented by the first parameter supports the browser feature represented by the second parameter upon determining that the first parameter matches one of the values in the file associated with the browser feature entry represented by the second parameter.

19. The article of manufacture of claim 18, wherein the file is a registry program including hardware and software configuration of information for the server.

20. The article of manufacture of claim 17 further comprising:

program code for removing the conditional command, the end tag, and the lines of code therebetween from the template upon determining that the browser program represented by the first parameter does not support the browser feature represented by the second parameter.

21. The article of manufacture of claim 17, wherein the template is a HyperText Markup Language (HTML) template, the browser program is an HTML browser, and wherein the server includes a HyperText Transfer Protocol (HTTP) program to receive requests from the browser program over the network.

22. An article of manufacture for use with a computer system, the article of manufacture comprising a computer-readable storage medium having program code embodied therein comprising:

program code for receiving a request for information from a browser program over a network, the browser program providing browser identification information to the system;

program code for, in response to the request for information, processing a template, the template including a conditional command having three parameters, a first parameter indicating the browser identification information, a second parameter representing a browser feature, and a third parameter indicating one of a first state and a second state, program code for processing the conditional command to determine whether the browser program represented by the first parameter supports the browser feature represented by the second parameter; and program code for generating lines of code into the template upon determining that the browser program represented by the first parameter supports the browser feature represented by the second parameter;

wherein the step of generating the lines of code into the template occurs upon making one of the following determinations:

that the browser program represented by the first parameter supports the browser feature represented by the second parameter and that the third parameter indicates the first state; and that the browser program represented by the first parameter does not support the browser feature represented by the second parameter and that the third parameter indicates the second state.

23. The article of manufacture of claim 17, wherein the browser identification information indicates a type and version of the browser program.

* * * * *